United States Patent
Maruyama et al.

(10) Patent No.: US 9,188,735 B2
(45) Date of Patent: Nov. 17, 2015

(54) OPTICAL FIBER, OPTICAL TRANSMISSION LINE, AND METHOD FOR MANUFACTURING OPTICAL FIBER

(71) Applicants: FUJIKURA LTD., Koto-ku,. Tokyo (JP); OSAKA PREFECTURE UNIVERSITY PUBLIC CORPORATION, Sakai, Osaka (JP)

(72) Inventors: Ryo Maruyama, Sakura (JP); Nobuo Kuwaki, Sakura (JP); Shoichiro Matsuo, Sakura (JP); Masaharu Ohashi, Sakai (JP)

(73) Assignees: FUJIKURA LTD., Tokyo (JP); OSAKA PREFECTURE UNIVERSITY PUBLIC CORPORATION, Osaka (JP)

(*) Notice: Subject to any disclaimer, the term of this patent is extended or adjusted under 35 U.S.C. 154(b) by 261 days.

(21) Appl. No.: 13/887,860

(22) Filed: May 6, 2013

(65) Prior Publication Data
US 2013/0243380 A1    Sep. 19, 2013

Related U.S. Application Data

(63) Continuation of application No. PCT/JP2012/071341, filed on Aug. 23, 2012.

(30) Foreign Application Priority Data

Aug. 26, 2011 (JP) ................... 2011-185269

(51) Int. Cl.
G02B 6/02 (2006.01)
G02B 6/036 (2006.01)

(52) U.S. Cl.
CPC .............. *G02B 6/02* (2013.01); *G02B 6/02019* (2013.01); *G02B 6/03627* (2013.01)

(58) Field of Classification Search
CPC .... G02B 6/028; G02B 6/0281; G02B 6/0288; G02B 6/02; G02B 6/02019; G02B 6/03627
See application file for complete search history.

(56) References Cited

U.S. PATENT DOCUMENTS

| | | | |
|---|---|---|---|
| 4,205,900 A | 6/1980 | Eve | |
| 4,877,304 A | 10/1989 | Bhagavatula | |
| 6,856,744 B2* | 2/2005 | Kumano | 385/127 |
| 7,058,271 B2* | 6/2006 | Koike et al. | 385/124 |
| 7,076,139 B1 | 7/2006 | Aikawa et al. | |
| 7,085,462 B2* | 8/2006 | Mukasa | 385/123 |
| 7,295,741 B2* | 11/2007 | Sako et al. | 385/127 |

(Continued)

FOREIGN PATENT DOCUMENTS

| | | |
|---|---|---|
| CN | 102124385 A | 7/2011 |
| JP | 2003-262752 A | 9/2003 |

(Continued)

OTHER PUBLICATIONS

Office Action issued by Japanese Patent Office in Japanese Application No. 2013-531258 dated Nov. 12, 2013.

(Continued)

*Primary Examiner* — Rhonda Peace
(74) *Attorney, Agent, or Firm* — Sughrue Mion, PLLC

(57) ABSTRACT

An optical fiber (1) includes (i) an inner core (111) whose refractive index distribution has an α profile, (ii) an outer core (112) which surrounds the inner core (111), and (iii) a clad (12) which surrounds the outer core (112). In the optical fiber (1), Rd is set to not less than 0.15, where Rd is a ratio of a refractive index difference between the outer core (112) and the clad (12) to a refractive index difference between a center part of the inner core (111) and the clad (12).

12 Claims, 8 Drawing Sheets

(56) References Cited

U.S. PATENT DOCUMENTS

| | | | |
|---|---|---|---|
| 7,583,878 B2* | 9/2009 | Sugizaki et al. | 385/126 |
| 8,542,969 B2* | 9/2013 | Bookbinder et al. | 385/126 |
| 8,693,834 B2* | 4/2014 | Bickham et al. | 385/127 |
| 2003/0133678 A1* | 7/2003 | Mukasa | 385/123 |
| 2003/0210878 A1* | 11/2003 | Kumano et al. | 385/127 |
| 2004/0042749 A1 | 3/2004 | Mukasa | |
| 2005/0024711 A1 | 2/2005 | Sugizaki et al. | |
| 2006/0034575 A1* | 2/2006 | Sako et al. | 385/127 |
| 2006/0045450 A1 | 3/2006 | Bickham | |
| 2006/0093297 A1 | 5/2006 | Sako et al. | |
| 2008/0310805 A1* | 12/2008 | Sugizaki et al. | 385/115 |
| 2010/0040336 A1 | 2/2010 | Chen et al. | |
| 2013/0243380 A1* | 9/2013 | Maruyama et al. | 385/123 |

FOREIGN PATENT DOCUMENTS

| | | |
|---|---|---|
| JP | 2004-12685 A | 1/2004 |
| WO | 2006/026314 A1 | 3/2006 |
| WO | 2010/019222 A1 | 2/2010 |

OTHER PUBLICATIONS

Communication dated Dec. 1, 2014, issued by the European Patent Office in corresponding European Application No. 12827491.7.

Communication dated Nov. 4, 2014, issued by the State Intellectual Property Office of the People's Republic of China in counterpart Application No. 201280003537.2.

Yasuyuki Kato et al., "Design Consideration on Broad-Band W-Type Two-Mode Optical Fibers", IEEE Transactions on Microwave Theory and Techniques, Jan. 1982, pp. 1-5, vol. MTT-30, No. 1.

K. Aikawa et al., "Single-Mode Optical Fiber With Large Effective Core Area", IEICE Electronics Society Taikai Koen Ronbunshu 1, Aug. 1999, pp. 183.

K. Takenaga et al., "Multimode dispersion compensation fibers for WDM transmission", Proceedings of the Society Conference of IEICE, Sep. 2003, pp. S-58-S-59.

R. Maruyama et al., "A Study on Design of Two-Mode Optical Fiber for Bundle Transmission", IEICE Communications Society Conference Koen Ronbunshu 2, Aug. 30, 2011, pp. 235.

L.G. Cohen et al., "Propagation Characteristics of Double-Mode Fibers", The Bell System Technical Journal, Jul.-Aug. 1980, pp. 1061-1072, vol. 59, No. 6.

Ken-Ichi Kitayama et al., "Structural Optimization for Two-Mode Fiber: Theory and Experiment", IEEE Journal of Quantum Electronics, Jun. 1981, pp. 1057-1063, vol. QE-17, No. 6.

International Search Report for PCT/JP2012/071341 dated Sep. 25, 2012.

* cited by examiner

OPTICAL FIBER, OPTICAL TRANSMISSION LINE, AND METHOD FOR MANUFACTURING OPTICAL FIBER

CROSS-REFERENCE TO RELATED APPLICATIONS

This application is a Continuation of PCT International Application No. PCT/JP2012/071341 filed in Japan on Aug. 23, 2012, which claims the benefit of Patent Application No. 2011-185269 filed in Japan on Aug. 26, 2011, the entire contents of which are hereby incorporated by reference.

TECHNICAL FIELD

The present invention relates to a two-mode optical fiber, an optical transmission line including the two-mode optical fiber, and a method for manufacturing the two-mode optical fiber.

BACKGROUND ART

In optical information communication, optical fibers which serve as transmission media have been required to have larger transmission capacity as communications traffic increases. Particularly, a long-distance transmission optical fiber employing Wavelength Division Multiplexing (WDM) has been keenly required to meet such requirement. Further, it is predicted that the communications traffic will continue to increase. Therefore, increase in the transmission capacity of the optical fibers is an urgent object to be attained.

In order to increase transmission capacity of an optical fiber, it is necessary to increase power of signal light to be supplied to the optical fiber. However, increase in the power of the signal light to be supplied to the optical fiber increases power density in a core, thereby causing problems such as production of a nonlinear optical effect and generation of fiber fuse. It is therefore necessary to increase an effective core area of the optical fiber so as to (i) avoid the problems and (ii) increase the transmission capacity of the optical fiber by increasing the power of the signal light to be supplied to the optical fiber.

The optical fiber whose effective core area is increased is exemplified in Patent Literatures 1 and 2.

Patent Literature 1 describes a technique of increasing, to 120 µm² or more, an effective core area of a single-mode fiber having a depressed refractive index distribution. Patent Literature 2 describes a technique of increasing, to 130 µm² or more, an effective core area of an optical fiber which has a core including a first core layer (high refractive index), a second core layer (low refractive index), and a third core layer (intermediate refractive index). The single-mode fibers described in Patent Literatures 1 and 2 have no mode dispersion and, also in this respect, have an advantage in having larger transmission capacity.

CITATION LIST

Patent Literatures

Patent Literature 1
Japanese Patent Application Publication, Tokukai, No. 2003-262752 A (Publication Date: Sep. 19, 2003)
Patent Literature 2
Japanese Patent Application Publication, Tokukai, No. 2004-12685 A (Publication Date: Jan. 15, 2004)

SUMMARY OF INVENTION

Technical Problem

The single-mode fibers described in Patent Literatures 1 and 2 have theoretical limitation on their core radiuses, and therefore cannot have core radiuses larger than the theoretical limitation. It was therefore impossible to sufficiently increase effective core areas of the single-mode fibers, thereby failing to sufficiently meet a requirement that the single-mode fibers have larger transmission capacity.

The following description will specifically discuss the problem. That is, a single-mode fiber should meet Expression (1) so as to cut off a second-order mode (LP11).

[Math 1]

$$V = \frac{2\pi}{\lambda} an1 \sqrt{2\left(\frac{n1^2 - n2^2}{2n1^2}\right)} \leq 2.405 \qquad (1)$$

where V represents a normalized frequency, λ represents a wavelength, a represents a core radius, n1 represents a refractive index of a core, and n2 represents a refractive index of a clad. Light only in a fundamental mode (LP01) is propagated in the single-mode fiber in a case where the core radius a, the refractive index n1, and the refractive index n2 are set so as to meet Expression (1). Thus, the single-mode fiber which carries out no mode dispersion can be realized.

However, the core radius a cannot be freely increased in a case where the core radius a is set to meet Expression (1). It is therefore impossible to freely increase an effective core area. Note that the core radius a can be increased by reduction in the refractive index n1 of the core. Meanwhile, decrease in the refractive index n1 of the core increases bend loss. Therefore, in a case where a standard or the like determines an upper limit of the bend loss, the core radius a is inevitably limited in Expression (1).

A core radius of a multimode fiber is not limited in Expression (1). This allows the multimode fiber to have an effective core area larger than that of the single-mode fiber. Meanwhile, the multimode fiber inevitably carries out mode dispersion. The mode dispersion reduces transmission capacity in proportion to a transmission distance. It is therefore important to prevent the mode dispersion so as to manufacture a multimode fiber which can carry out long-distance transmission with large transmission capacity.

A two-mode optical fiber is a multimode fiber which transmits light in a fundamental mode or in a second-order mode and whose mode dispersion is most easily prevented. Meanwhile, it is unclear what values parameters which define a structure of the two-mode optical fiber should have so that the two-mode optical fiber cuts off a third-order mode and minimizes the mode dispersion. On this account, a two-mode optical fiber which can carry out long-distance transmission has not been developed at this stage.

The present invention was made in view of the problems, and an object of the present invention is to provide a two-mode optical fiber which has a reduced mode dispersion. Another object of the present invention is to provide an optical fiber which not only has a reduced mode dispersion but also has a large effective core area and a small bend loss.

Solution to Problem

In order to attain the object, an optical fiber of the present invention is configured to include: an inner core whose refractive index distribution has an α profile (power-law index profile); an outer core which surrounds the inner core; and a clad which surrounds the outer core, the optical fiber having Rd of not less than 0.15 where Rd is a ratio of a relative refractive index difference between the outer core and the clad to a relative refractive index difference between a center part of the inner core and the clad.

According to the configuration, it is possible to realize an optical fiber which meets a third-order mode cutoff condition and a low mode dispersion condition by appropriately setting parameters Ra and Δ, and a core radius a (which will be later described).

What is meant by the third-order mode cutoff condition is a condition imposed on a parameter which defines a structure of an optical fiber so that the optical fiber can cut off a third-order mode or higher-order modes of light which has entered the optical fiber. That is, the third-order mode cutoff condition is a condition imposed on a parameter which defines a structure of an optical fiber so that the optical fiber can function as a two-mode optical fiber. What is meant by the low mode dispersion condition is a condition imposed on a parameter which defines a structure of an optical fiber so that a mode dispersion Δτ is not less than −5 ps/km but not more than +20 ps/km.

In order to attain the object, an optical transmission line of the present invention is configured to include: the optical fiber; and a mode dispersion compensating optical fiber having a mode dispersion which is opposite in sign to a mode dispersion of the optical fiber.

According to the configuration, it is possible to realize an optical transmission line whose mode dispersion is smaller than that of an optical transmission line constituted by the optical fiber only.

In order to attain the object, a method of the present invention for manufacturing an optical fiber including an inner core whose refractive index distribution has an α profile, an outer core which surrounds the inner core, and a clad which surrounds the outer core, the method including the step of: setting respective refractive indices of the inner core, the outer core, and the clad so that the optical fiber has Rd of not less than 0.15 where Rd is a ratio of a relative refractive index difference between the outer core and the clad to a relative refractive index difference between a center part of the inner core and the clad.

According to the arrangement, it is possible to produce an optical fiber which meets the third-order mode cutoff condition and the low mode dispersion condition by appropriately setting the parameters Ra and Δ, and the core radius a (which will be later described).

Advantageous Effects of Invention

According to the present invention, it is possible to realize an optical fiber which meets a third-order mode cutoff condition and a low mode dispersion condition by appropriately setting parameters Ra and Δ, and a core radius a. That is, it is possible to manufacture a two-mode optical fiber whose mode dispersion is reduced, by appropriately setting the parameters Ra and Δ, and the core radius a.

Figure 1:
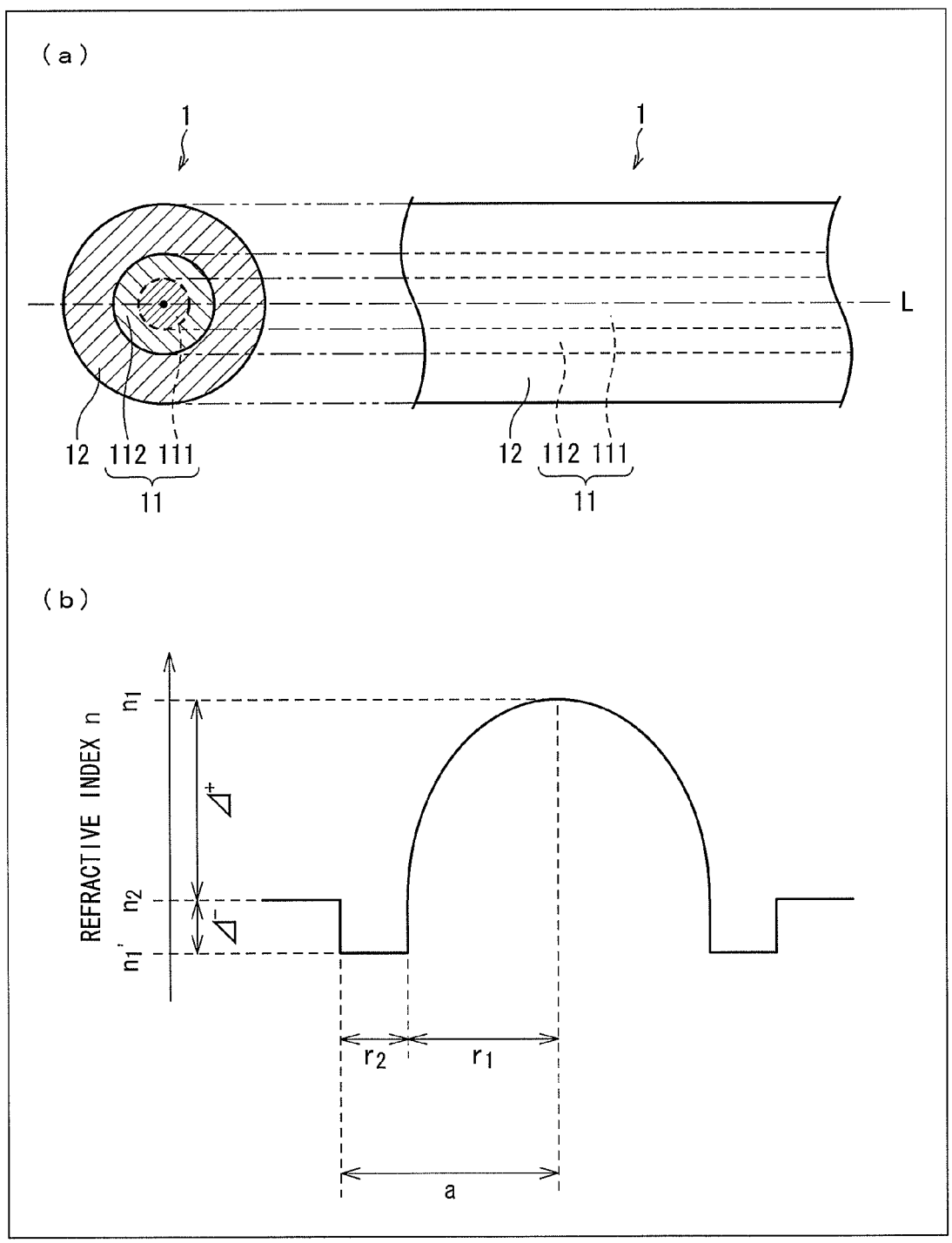
FIG. 1 is a view illustrating a structure of an optical fiber in accordance with an embodiment of the present invention. (a) of FIG. 1 illustrates a cross section and a side surface of the optical fiber. (b) of FIG. 1 is a graph showing a refractive index distribution of the optical fiber.
Figure 4:
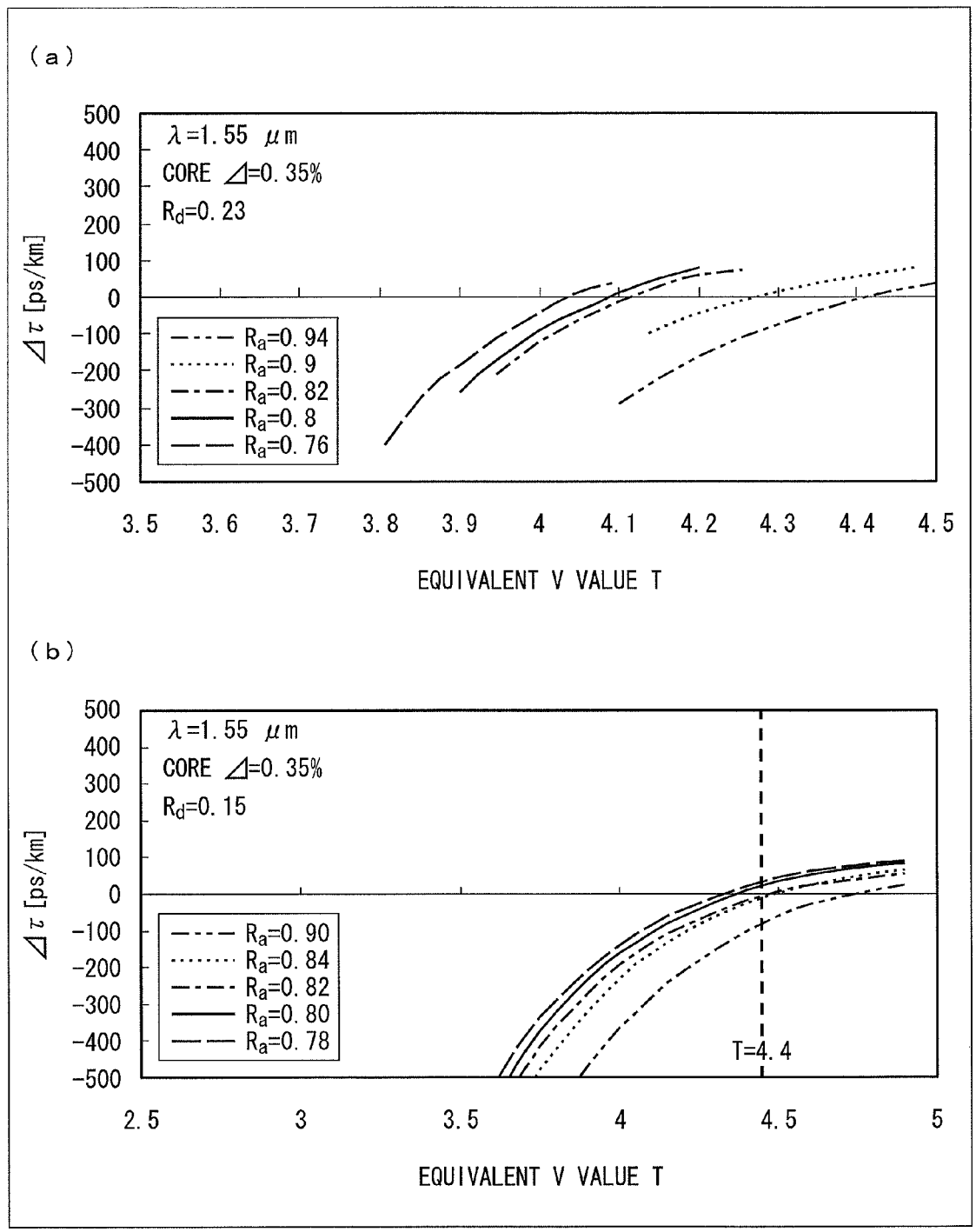

(a) of FIG. 4 is a graph showing a relationship between an equivalent V value T and a mode dispersion Δτ which are obtained in a case where (i) Rd of the optical fiber illustrated in FIG. 1 is 0.23 and (ii) Ra of the optical fiber illustrated in FIG. 1 is set to 0.76, 0.80, 0.82, 0.90, or 0.94.

(b) of FIG. 4 is a graph showing a relationship between an equivalent V value T and a mode dispersion Δτ which are obtained in a case where (i) Rd of the optical fiber illustrated in FIG. 1 is 0.15 and (ii) Ra of the optical fiber illustrated in FIG. 1 is set to 0.78, 0.80, 0.82, 0.84, or 0.90.

Figure 5:
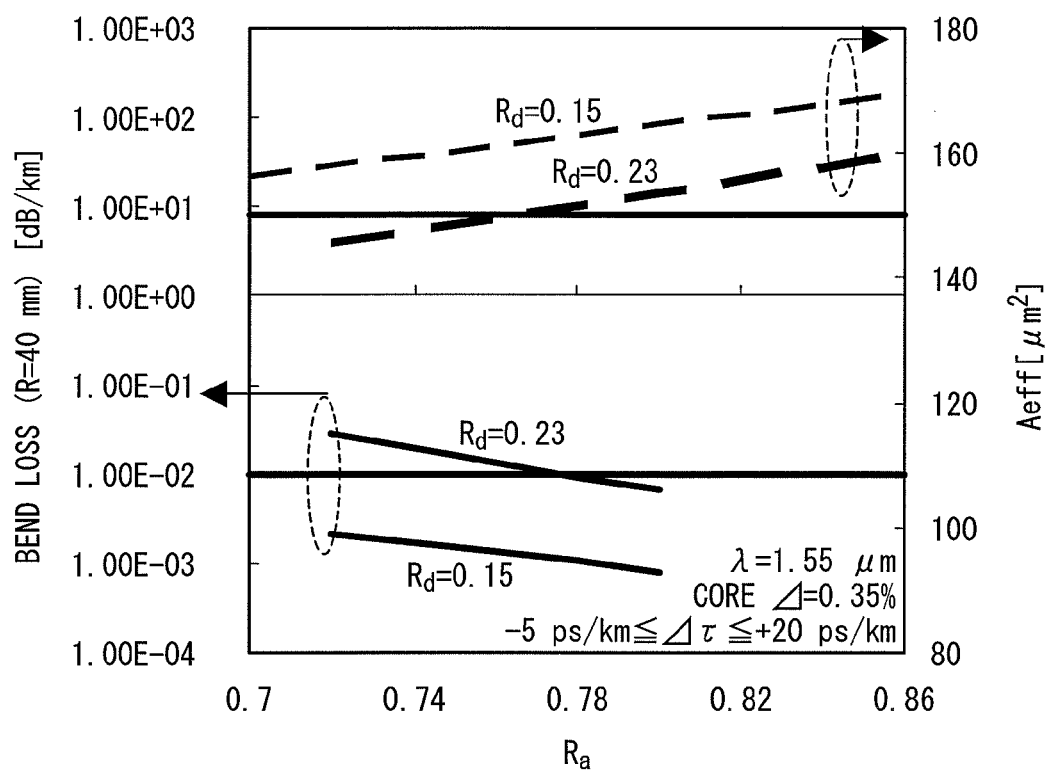

FIG. 5 is a graph showing a relationship (indicated by a dash line) between an effective core area Aeff and Ra, and a relationship (indicated by a solid line) between a bend loss and the Ra of the optical fiber illustrated in FIG. 1.

Figure 6:
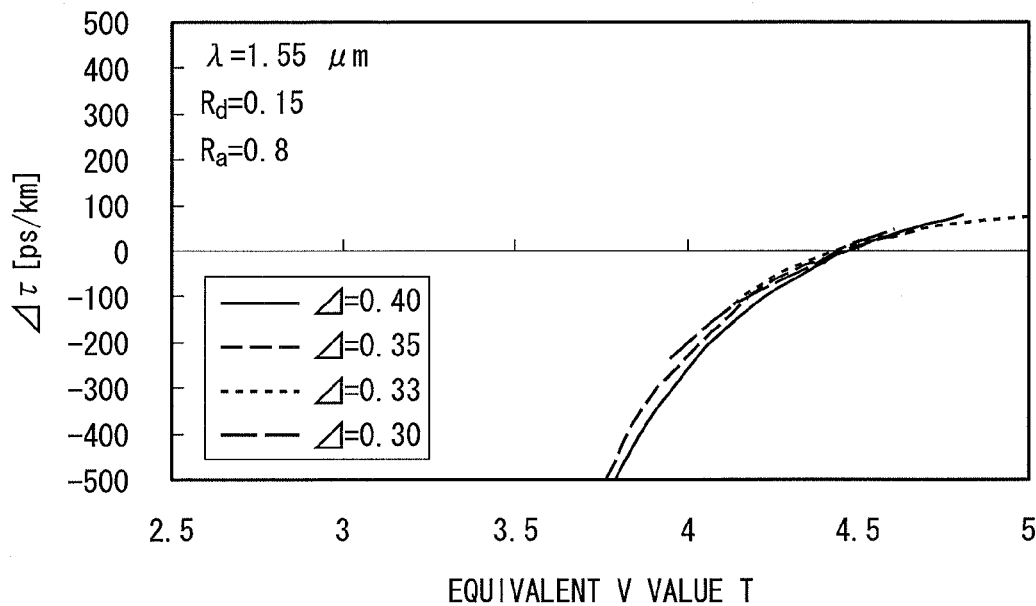

FIG. 6 is a graph showing a relationship between an equivalent V value T and a mode dispersion Δτ which are obtained in a case where a core Δ of the optical fiber illustrated in FIG. 1 is set to 0.3%, 0.33%, 0.35% or 0.4%.

Figure 7:
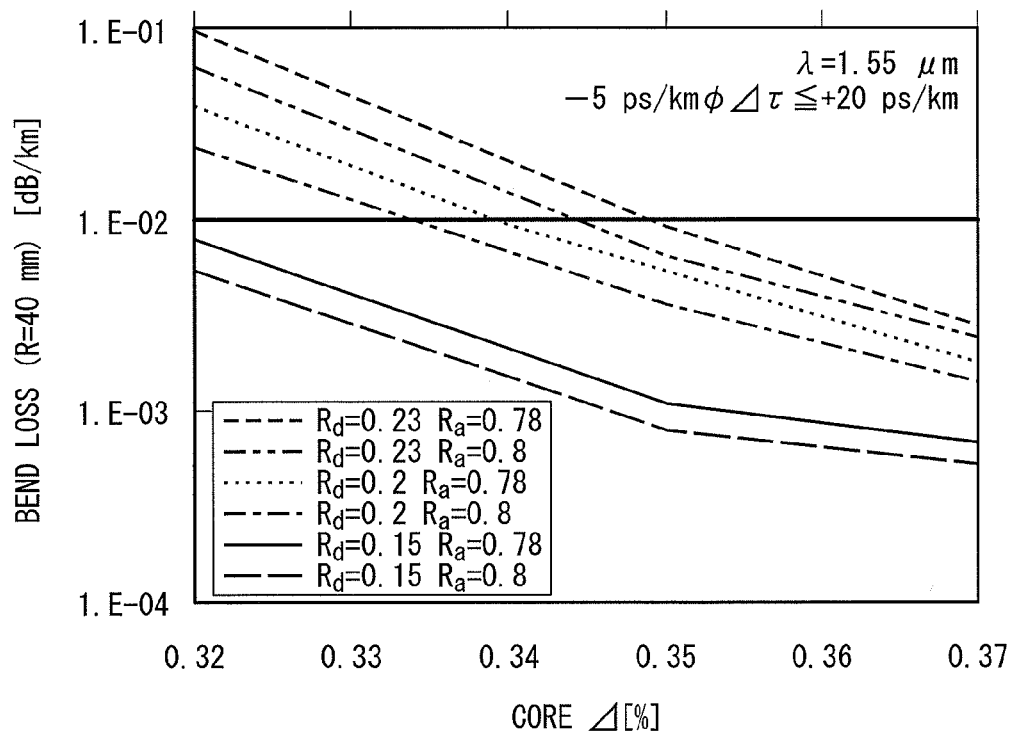

FIG. 7 is a graph showing a relationship between a bend loss and a core Δ of the optical fiber illustrated in FIG. 1.

Figure 8:
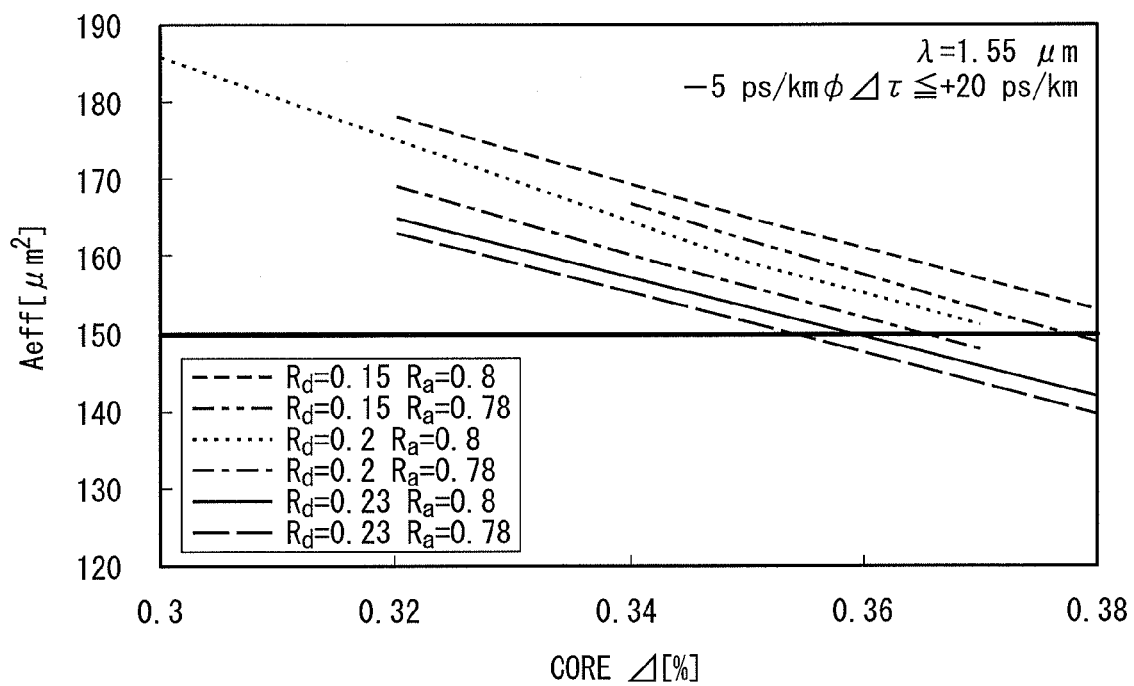

FIG. 8 is a graph showing a relationship between an effective core area Aeff and a core Δ of the optical fiber illustrated in FIG. 1.

Figure 9:
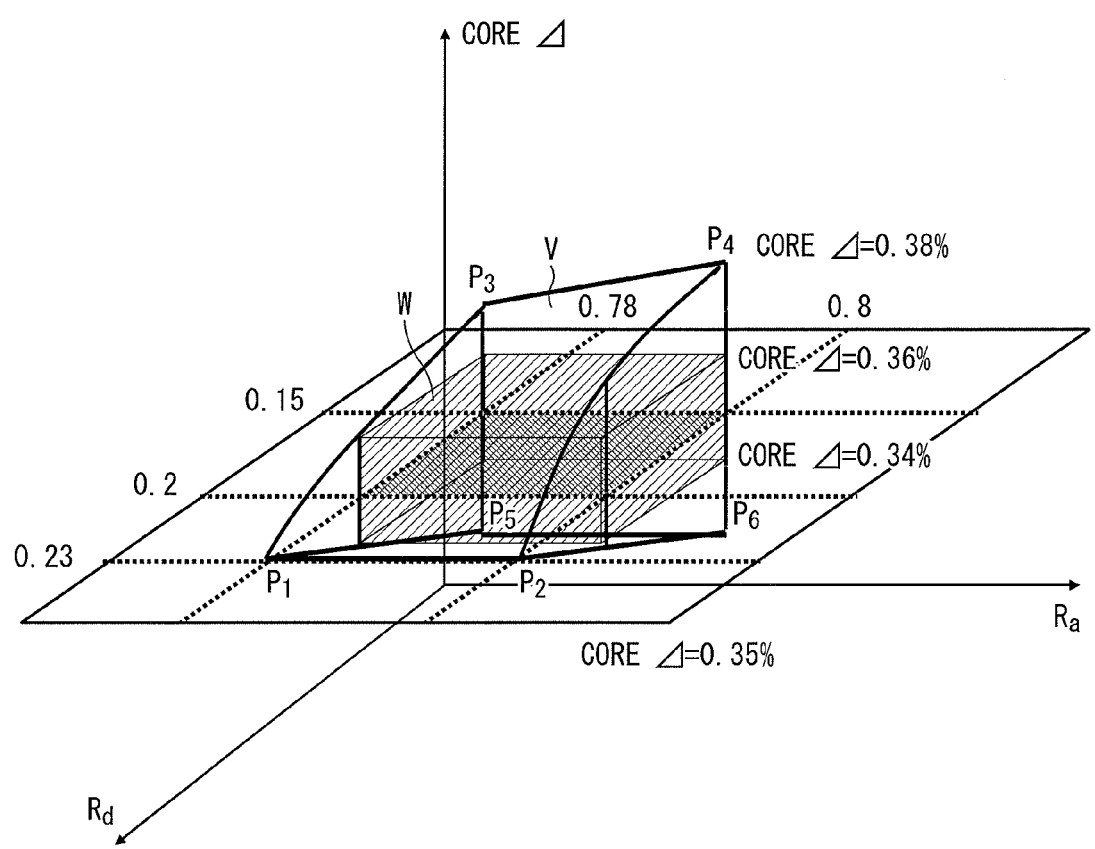

FIG. 9 is a graph showing a region V which meets a third-order mode cutoff condition, a low mode dispersion condition, a large effective core area condition, and a low bend loss condition in a parameter space P spanned by parameters Rd, Ra and Δ.

Figure 10:
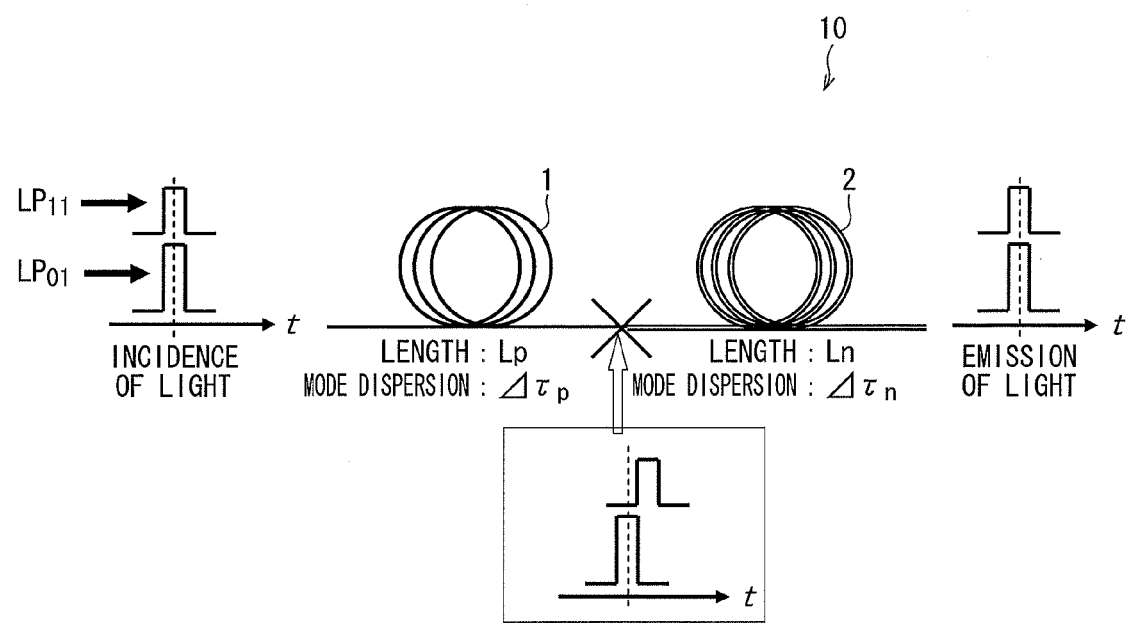

FIG. 10 is a view illustrating an example configuration of an optical transmission line including the optical fiber illustrated in FIG. 1.

DESCRIPTION OF EMBODIMENTS

Structure of Optical Fiber

The following description will discuss a structure of an optical fiber 1 in accordance with the present embodiment, with reference to FIG. 1. (a) of FIG. 1 illustrates a cross section and a side surface of the optical fiber 1. (b) of FIG. 1 is a graph showing a refractive index distribution of the optical fiber 1. Note that the refractive index distribution illustrated in (b) of FIG. 1 is a refractive index distribution on a straight line orthogonal to a center axis L (see (a) of FIG. 1) of the optical fiber 1 illustrated in (a) of FIG. 1.

The optical fiber 1 is a cylindrical structure which mainly contains silica glass. The optical fiber 1 is made up of (i) a core 11 having a circular cross section (having a radius a) and (ii) a clad 12 which has an annular cross section (having an inner radius a and an outer radius b) and surrounds the core 11 (see (a) of FIG. 1). The core 11 is made up of (i) an inner core 111 having a disc-shaped cross section (having a radius r1) and (ii) an outer core 112 which has an annular cross section (having an inner radius r1 and an outer radius r1+r2) and surrounds the inner core 111. The inner core 111 is different from the outer core 112 in refractive index distribution. Any cross sections of the optical fiber 1 taken orthogonal to the center axis L have an identical cross-sectional structure. Note that the outer core 112 is also called "trench".

The refractive index distribution of the inner core 111 has an α profile (more specifically, an α profile where α=2) where the inner core 111 has a maximum refractive index n1 on the center axis L (see (b) of FIG. 1). Note here that the α profile represents a refractive index distribution in which a refractive index n(r) of a point which is distant by r from the center axis L is represented by $n1[1-2\delta(r/a)^\alpha]^{1/2}$ where δ represents a relative refractive index difference between a center part of the inner core 111 and the outer core 112. A refractive index n1' of the outer core 112 is fixed as shown in (b) of FIG. 1. A refractive index n2 of the clad 12 is also fixed as shown in (b) of FIG. 1. There is a relationship of n1'<n2<n1 among the maximum refractive index n1 of the inner core 111, the refractive index n1' of the outer core 112, and the refractive index n2 of the clad 12. The refractive index distribution described above can be realized by, for example, a conventionally well-known technique of adding germanium (Ge) so as to locally increase a refractive index or adding fluorine (F) so as to locally decrease a refractive index.

In (b) of FIG. 1, Δ+ represents a relative refractive index difference $[(n1^2-n2^2)/2n1^2] \times 100$ [%] between the center part of the inner core 111 and the clad 12, and Δ− represents a relative refractive index difference $[(n1'^2-n2^2)/2n1'^2] \times 100$ [%] between the outer core 112 and the clad 12.

The following description mainly uses Δ, Rd, and Ra as parameters which define the structure of the optical fiber 1. The parameter Δ represents the relative refractive index difference Δ+ itself, the parameter Rd represents a ratio Δ−/Δ+ of the relative refractive index difference Δ− to the relative refractive index difference Δ+, and the parameter Ra represents a ratio r1/a of the radius r1 of the inner core 111 to the radius a of the core 11. The relative refractive index difference Δ− can be represented by Δ−=Δ+×Rd with use of the parameter Rd. The radius r1 of the inner core 111 can be represented by r1=Ra×a with use of the parameter Ra. A thickness r2 of the outer core 112 can be represented by r2=(1−Ra)×a with use of the parameter Ra. The relative refractive index difference Δ is hereinafter referred to also as "core Δ".

The following description also uses an equivalent V value T so as to indicate a transmission property of the optical fiber 1. The equivalent V value T is defined by $T=\int [n^2(r)-n^2(\infty)]k^{1/2}dr$ (having an integral range of 0 to ∞) where n(r) represents a refractive index of a point which is distant by r from the center axis L, and k represents a wavenumber of light that enters the optical fiber 1 (hereinafter referred to as "incident light"). The equivalent V value T has a relationship represented by Expression (2) with a normalized frequency V.

[Math 2]

$$T = \frac{V}{A} = \frac{\frac{2\pi}{\lambda} a n1 \sqrt{2\left(\frac{n1^2-n2^2}{2n1^2}\right)}}{A} \quad (2)$$

where A represents a constant called shape constant.

The optical fiber 1 having the refractive index distribution shown in (b) of FIG. 1 cuts off a third-order mode (LP21) in a case where the equivalent V value T is not more than 4.4. That is, the optical fiber 1 functions as a TMF (a two-mode optical fiber) in the case where the equivalent V value T is not more than 4.4. Note that the third-order mode cutoff condition (where the equivalent V value T is not more than 4.4) is a condition found by the inventors of the present invention as a result of a numerical experiment.

The optical fiber 1 of the present embodiment is, briefly speaking, an optical fiber whose parameters a, Δ, Rd, and Ra are optimized so as to meet the following conditions (1) through (4): (1) the third-order mode cutoff condition is met, (2) a mode dispersion Δτ is small, (3) an effective core area Aeff is large, and (4) a bend loss is small. More specifically, the optical fiber 1 is an optical fiber whose parameters a, Δ, Rd, and Ra are set so as to meet the following conditions (1) through (4) in a case where a wavelength λ of the incident light is 1.55 μm: (1) the third-order mode cutoff condition is met, (2) the mode dispersion Δτ is not less than −5 ps/km but not more than +20 ps/km (ps represents "picosecond"), (3) an effective core area Aeff related to an LP01 is not less than 150 μm$^2$, and (4) a bend loss (R=40 mm) related to an LP11 is not more than 1.0×10$^{-2}$ dB/km. The conditions (2), (3), and (4) are hereinafter referred to as "low mode dispersion condition", "large effective core area condition", and "low bend loss condition", respectively.

(Setting of Rd)

Figure 2:
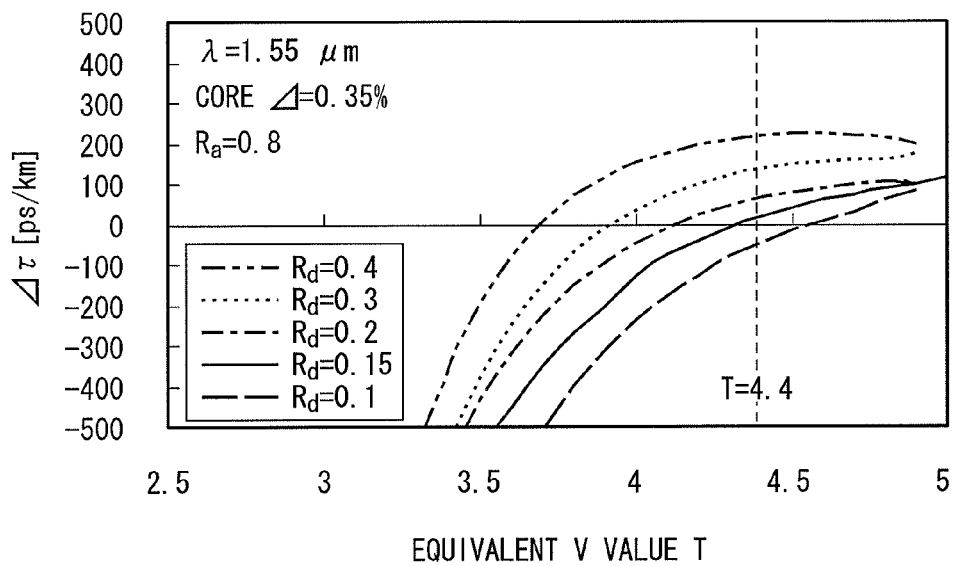
FIG. 2 is a graph showing a relationship between an equivalent V value T and a mode dispersion Δτ which are obtained in a case where Rd of the optical fiber illustrated in FIG. 1 is set to 0.1, 0.15, 0.2, 0.3, or 0.4.
Figure 3:
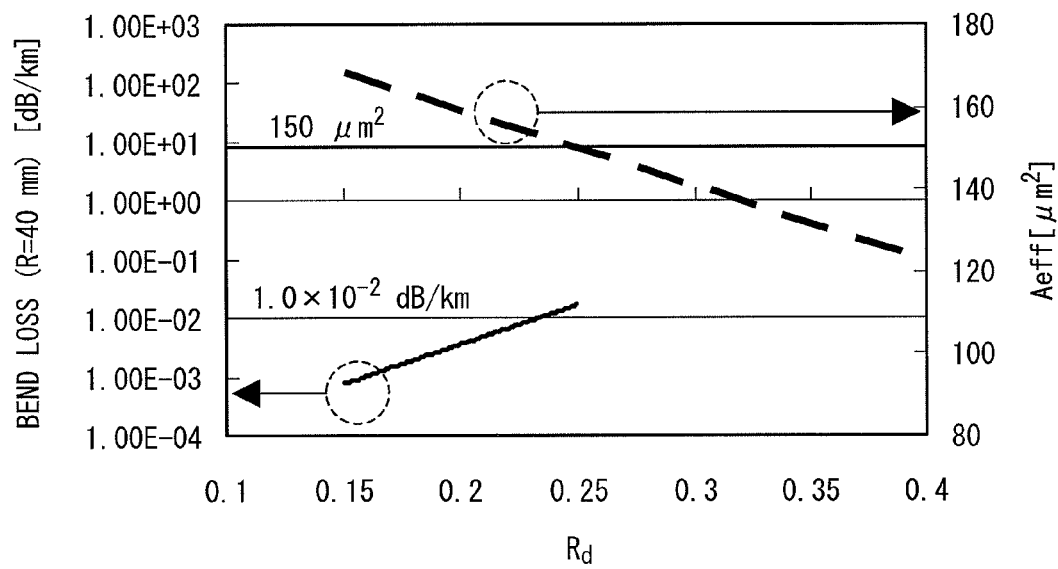
FIG. 3 is a graph showing a relationship (indicated by a dash line) between an effective core area Aeff and Rd, and a relationship (indicated by a solid line) between a bend loss and Rd of the optical fiber illustrated in FIG. 1.

The following description will discuss setting of Rd with reference to FIGS. 2 and 3. Particularly, a range of Rd that meets the above-described four conditions (1) through (4) will be described.

FIG. 2 is a graph showing a relationship between an equivalent V value T and a mode dispersion Δτ which are obtained in a case where Rd is 0.1, 0.15, 0.2, 0.3, or 0.4. The graph is obtained by calculating the equivalent V value T and the mode dispersion Δτ while changing a core radius a under the condition that a wavelength λ of incident light, Ra, and a core Δ are fixed to 1.55 μm, 0.80, and 0.35%, respectively.

As is clear from FIG. 2, in the case where Rd is 0.1, a range of an equivalent V value T that yields a mode dispersion Δτ within a range of not less than −5 ps/km but not more than +20 ps/km is included in a region defined by T>4.4. That is, in the case where Rd is 0.1, the low mode dispersion condition and the third-order mode cutoff condition cannot be met together. Meanwhile, in the case where Rd is 0.15, 0.2, 0.3, or 0.4, a range of an equivalent V value T that yields a mode dispersion Δτ within a range of not less than −5 ps/km but not more than +20 ps/km is included in a region defined by T≤4.4. That is, the low mode dispersion condition and the third-order mode cutoff condition can be met together.

The equivalent V value T that meets the low mode dispersion condition increases monotonously as Rd decreases, and the equivalent V value T that meets the low mode dispersion condition T is approximately 4.4 in the case where Rd is 0.15. It follows that the low mode dispersion condition and the third-order mode cutoff condition can be met together in a case where Rd is not less than 0.15, whereas the low mode dispersion condition and the third-order mode cutoff condition cannot be met together in a case where Rd is less than 0.15.

The following conclusion is obtained from the graph shown in FIG. 2. That is, it is preferable that Rd of the optical fiber 1 be set to not less than 0.15. This enables the optical fiber 1 to meet the low mode dispersion condition and the third-order mode cutoff condition.

FIG. 3 is a graph showing a relationship (indicated by a dash line) between an effective core area Aeff and Rd, and a relationship (indicated by a solid line) between a bend loss and Rd. The graph is obtained by calculating (i) an effective core area Aeff for each Rd value and (ii) a bending loss for each Rd value, under the condition that a wavelength λ of incident light, Ra, and a core Δ are fixed to 1.55 μm, 0.80, and 0.35%, respectively. At this time, a core radius a is set so as to meet the low mode dispersion condition for each Rd value.

Note that the reason why the bend loss has a positive correlation with Rd in FIG. 3 is that the core radius a is set so as to meet the low mode dispersion condition (in a case where the core radius a is constant, the bend loss has a negative correlation with Rd). That is, as Rd decreases, the core radius a (proportional to the equivalent V value T) that meets the low mode dispersion condition increases (see FIG. 2) and, as a result, the bend loss decreases.

As is clear from FIG. 3, in a case where Rd is not more than 0.25, the effective core area Aeff is not less than 150 µm². That is, the large effective core area condition is met. Further, in a case where Rd is not more than 0.23, the bend loss (R=40 mm) is not more than $1.0 \times 10^{-2}$ dB/km. That is, the low bend loss condition is further met.

The following conclusion is obtained from the graph shown in FIG. 3. That is, it is preferable that Rd of the optical fiber 1 be set to not more than 0.25. This enables the optical fiber 1 to meet the large effective core area condition. Further, it is more preferable that Rd of the optical fiber 1 be set to not more than 0.23. This enables the optical fiber 1 to meet the large effective core area condition and the low bend loss condition at the same time.

On the basis of the findings, it is most preferable to set Rd of the optical fiber 1 of the present embodiment to not less than 0.15 but not more than 0.23. This enables the optical fiber 1 to meet all of the above-described four conditions, that is, the third-order mode cutoff condition, the low mode dispersion condition, the large effective core area condition, and the low bend loss condition. Note, however, that Rd may be set to not less than 0.15 but not more than 0.25. In this case, the three conditions other than the low bend loss condition among the above-described four conditions can be met.

(Setting of Ra)

The following description will discuss setting of Ra with reference to FIGS. 4 and 5. Particularly, a range of Ra that meets the above-described four conditions in the case where Rd is set to not less than 0.15 but not more than 0.23 will be described.

(a) of FIG. 4 is a graph showing a relationship between an equivalent V value T and a mode dispersion Δτ which are obtained in a case where Ra is 0.76, 0.80, 0.82, 0.90 or 0.94. The graph is obtained by calculating the equivalent V value T and the mode dispersion Δτ while changing a core radius a under the condition that a wavelength λ of incident light, Rd, and a core Δ are fixed to 1.55 µm, 0.23, and 0.35%, respectively.

As is clear from (a) of FIG. 4, in any cases where Ra is 0.76, 0.80, 0.82, 0.90 or 0.94, a range of an equivalent V value T that yields a mode dispersion Δτ within a range of not less than −5 ps/km but not more than +20 ps/km is included in a region defined by T≤4.4. That is, the low mode dispersion condition and the third-order mode cutoff condition can be met together.

The equivalent V value T that meets the low mode dispersion condition increases monotonously as Ra increases, and the equivalent V value T that meets the low mode dispersion condition T is approximately 4.4 in the case where Ra is 0.94. It follows that the low mode dispersion condition and the third-order mode cutoff condition can be met together in a case where Ra is not more than 0.94, whereas the low mode dispersion condition and the third-order mode cutoff condition cannot be met together in a case where Ra is more than 0.94.

The following conclusion is obtained from the graph shown in (a) of FIG. 4. That is, it is preferable to set Ra of the optical fiber 1 to not more than 0.94 in a case where Rd of the optical fiber 1 is set to 0.23. This enables the optical fiber 1 to meet both the low mode dispersion condition and the third-order mode cutoff condition.

(b) of FIG. 4 is a graph showing a relationship between an equivalent V value T and a mode dispersion Δτ which are obtained in a case where Ra is 0.78, 0.80, 0.82, 0.84 or 0.90. The graph is obtained by calculating the equivalent V value T and the mode dispersion Δτ while changing a core radius a under the condition that a wavelength λ of incident light, Rd, and a core Δ are fixed to 1.55 µm, 0.15, and 0.35%, respectively. As is clear from (b) of FIG. 4, in a case where Ra is not more than 0.8, the low mode dispersion condition and the third-order mode cutoff condition can be met together. In contrast, in a case where Ra is more than 0.8, the low mode dispersion condition and the third-order mode cutoff condition cannot be met together.

That is, it is preferable to set Ra of the optical fiber 1 to not more than 0.8 in a case where Rd of the optical fiber 1 is set to 0.15. This enables the optical fiber 1 to meet both the low mode dispersion condition and the third-order mode cutoff condition. By setting Ra to not more than 0.8, it is possible to meet both the low mode dispersion condition and the third-order mode cutoff condition even in cases where Rd is set to 0.15, 0.23, or a value in a range of 0.15 through 0.23.

FIG. 5 is a graph showing a relationship (indicated by a dash line) between an effective core area Aeff and Ra, and a relationship (indicated by a solid line) between a bend loss and Ra. The graph is obtained by calculating (i) an effective core area Aeff for each Ra value and (ii) a bending loss for each Ra value, under the conditions that (i) a wavelength λ of incident light is fixed to 1.55 µm, (ii) Rd is fixed to 0.15 or 0.23, and (iii) a core Δ is fixed to 0.35%. At this time, a core radius a is set so as to meet the low mode dispersion condition for each Rd value.

Note that the reason why the bend loss has a negative correlation with Ra in FIG. 5 is that the core radius a is set so as to meet the low mode dispersion condition (in a case where the core radius a is constant, the bend loss has a positive correlation with Ra). That is, as Ra increases, the core radius a (proportional to the equivalent V value T) that meets the low mode dispersion condition increases (see FIG. 2) and, as a result, the bend loss decreases.

As is clear from FIG. 5, in a case where Rd is 0.23 and the Ra is not less than 0.77, the effective core area Aeff is not less than 150 µm². That is, the large effective core area condition is met. Further, in a case where Rd is 0.23 and the Ra is not less than 0.78, the bend loss (R=40 mm) is not more than $1.0 \times 10^{-2}$ dB/km. That is, the low bend loss condition is further met.

Note that by setting Rd to 0.15, it is possible to meet the large effective core area condition even in a case where Ra is reduced to 0.70. Accordingly, by setting Ra to not less than 0.77 as mentioned above, it is possible to meet the large effective core area condition even in cases where Rd is set to 0.15, 0.23, or a value in a range of 0.15 through 0.23.

Further, by setting Rd to 0.15, it is possible to meet the low bend loss condition even in a case where Ra is reduced to 0.72 (extrapolation of the graph makes it apparent that in reality, the low bend loss condition is met even in a case where Ra is reduced to 0.70). Therefore, by setting Ra to not less than 0.78 as mentioned above, it is possible to meet the low bend loss condition even in the cases where Rd is set to 0.15, 0.23, or a value in a range of 0.15 through 0.23.

On the basis of the findings, it is most preferable to set Ra of the optical fiber 1 of the present embodiment to not less than 0.78 but not more than 0.80. This, when Rd is set to any value that is not less than 0.15 but not more than 0.23, makes it possible to meet all of the above-described four conditions, that is, the third-order mode cutoff condition, the low mode dispersion condition, the large effective core area condition, and the low bend loss condition.

Note that Ra may be set to not less than 0.78 but not more than 0.94. In this case, all of the above-described four conditions can be met at least when Rd is set to 0.23. Alternatively, Ra may be set to not less than 0.77 but not more than 0.94. In this case, the three conditions other than the low bend loss condition among the four conditions can be met at least when Rd is set to 0.23.

Alternatively, Ra may be set to not less than 0.72 but not more than 0.8. In this case, all of the four conditions can be met at least when Rd is set to 0.15. Alternatively, Ra may be set to not less than 0.7 but not more than 0.8. In this case, the three conditions other than the low bend loss condition among the four conditions can be met at least when Rd is set to 0.15 (in reality, all of the four conditions can be met).

(Setting of Core Δ)

The following description will discuss setting of a core Δ with reference to FIGS. 6 through 8. Particularly, a range of a core Δ that meets the four conditions in a case where (i) Rd is set to not less than 0.15 but not more than 0.23 and (ii) Ra is set to not less than 0.78 but not more than 0.80 will be described.

FIG. 6 is a graph showing a relationship between an equivalent V value T and a mode dispersion Δτ which are obtained in a case where the core Δ is 0.3%, 0.33%, 0.35%, or 0.4%. The graph is obtained by calculating the equivalent V value T and the mode dispersion Δτ while changing a core radius a under the condition that the wavelength λ of the incident light, Rd, and Ra are fixed to 1.55 μm, 0.15, and 0.8, respectively.

As is clear from FIG. 6, the relationship between the equivalent V value T and the mode dispersion Δτ does not substantially change even in a case where the value of the core Δ is changed. It is therefore possible to meet both the low mode dispersion condition and the third-order mode cutoff condition regardless of the value of the core Δ, in the case where (i) Rd is set to not less than 0.15 but not more than 0.23 and (ii) Ra is set to not less than 0.78 but not more than 0.80.

FIG. 7 is a graph showing a relationship between a bend loss and a core Δ. The graph is obtained by calculating a bend loss for each core Δ value under the condition that (i) a wavelength λ of incident light is fixed to 1.55 μm, (ii) Rd is fixed to 0.15, 0.20, or 0.23, and (ii) Ra is fixed to 0.78 or 0.80. At this time, a core radius a is determined so as to meet the low mode dispersion condition.

For each combination of Ra and Rd, Table 1 shows a range of a core Δ that meets the low bend loss condition. As is clear from Table 1, by setting the core Δ to not less than 0.35%, it is possible to meet the low bend loss condition with respect to all of the combinations of Ra and Rd.

TABLE 1

|    |      | Rd              |                 |                 |
|----|------|-----------------|-----------------|-----------------|
|    |      | 0.15            | 0.2             | 0.23            |
| Ra | 0.78 | core Δ ≥ 0.32   | core Δ ≥ 0.34   | core Δ ≥ 0.35   |
|    | 0.8  | core Δ ≥ 0.32   | core Δ ≥ 0.34   | core Δ ≥ 0.35   |

FIG. 8 is a graph showing a relationship between an effective core area Aeff and a core Δ. The graph is obtained by calculating effective core areas Aeff for respective cores Δ under the condition that (i) a wavelength λ of incident light is fixed to 1.55 μm, (ii) Rd is fixed to 0.15, 0.20, or 0.23, and (iii) Ra is fixed to 0.78 or 0.80. At this time, a core radius a is determined so as to meet the low mode dispersion condition.

For each combination of Ra and Rd, Table 2 shows a range of a core Δ that meets the large effective core area condition. As is clear from Table 2, by setting the core Δ to not more than 0.35%, it is possible to meet the large effective core area condition with respect to all of the combinations of Ra and Rd.

TABLE 2

|    |      | Rd              |                 |                 |
|----|------|-----------------|-----------------|-----------------|
|    |      | 0.15            | 0.2             | 0.23            |
| Ra | 0.78 | core Δ ≤ 0.37   | core Δ ≤ 0.36   | core Δ ≤ 0.35   |
|    | 0.8  | core Δ ≤ 0.38   | core Δ ≤ 0.37   | core Δ ≤ 0.35   |

(Region in Parameter Space which Meets Four Conditions)

FIG. 9 shows a region V in a parameter space P spanned by parameters Rd, Ra and Δ, which region V meets all of the four conditions (the third-order mode cutoff condition, the low mode dispersion condition, the large effective core area condition, and the low bend loss condition).

As shown in FIG. 9, the region V can be approximated by a pentahedron defined by the following six vertexes P1 through P6 (see Tables 1 and 2). It is therefore possible to meet the four conditions simultaneously by setting (Rd, Ra, Δ) to be included in the pentahedron.

P1=(0.23, 0.78, 0.35)
P2=(0.23, 0.80, 0.35)
P3=(0.15, 0.78, 0.37)
P4=(0.15, 0.80, 0.38)
P5=(0.15, 0.78, 0.32)
P6=(0.15, 0.80, 0.32)

Further, as shown in FIG. 9, the region V includes a rectangular parallelepiped W represented by the following three inequalities. As a matter of course, in a case where (Rd, Ra, Δ) is included in the rectangular parallelepiped W, the conditions (1) through (4) are met simultaneously.

$$0.15 \leq Rd \leq 0.20$$

$$0.78 \leq Ra \leq 0.80$$

$$0.34\% \leq \Delta \leq 0.36\%$$

Example Setting of Parameter

Table 3 shows an example setting of parameters Δ, Rd, and Ra of the optical fiber 1. In the example setting, the core radius a is 15.5, and the equivalent V value T is 4.27.

TABLE 3

| Parameter         | Value |
|-------------------|-------|
| Core Δ            | 0.34  |
| Rd                | 0.2   |
| Ra                | 0.8   |
| Core radius       | 15.5  |
| Equivalent V value T | 4.27 |

Table 4 shows transmission properties (mode dispersion, wavelength dispersion, bend loss, and effective core area) which are calculated under the setting of the parameters Δ, Rd, and Ra as shown in Table 3.

TABLE 4

| | Wavelength dispersion at 1550 nm [ps/km/nm] | | $LP_{11}$ bend loss (R = 40 mm) | $LP_{01}$ $A_{eff}$ |
|---|---|---|---|---|
| $\Delta\tau$ [ps/km] | $LP_{01}$ | $LP_{11}$ | [dB/km] | [µm²] |
| +3.2 | 21.45 | 9.21 | $6.88 \times 10^{-6}$ | 162.1 |

As is clear from Table 4, it is possible to meet all of the four conditions (the third-order mode cutoff condition, the low mode dispersion condition, the large effective core area condition, and the low bend loss condition) in a case where the parameters $\Delta$, Rd, and Ra are set as shown in Table 3. In particular, as is shown by the effective core area Aeff that reaches 162.1, it is possible to attain a remarkably large effective core area Aeff which was conventionally difficult to attain.

Table 5 shows another example setting of the parameters $\Delta$, Rd, and Ra of the optical fiber 1. In the another example setting, the core radius a is 15.72, and the equivalent V value T is 4.24.

TABLE 5

| Parameter | Value |
|---|---|
| Core $\Delta$ | 0.35 |
| Rd | 0.2 |
| Ra | 0.78 |
| Core radius | 15.72 |
| Equivalent V value T | 4.24 |

Table 6 shows transmission properties (mode dispersion, wavelength dispersion, bend loss, and effective core area) of the optical fiber 1 which are calculated under the setting of the parameters $\Delta$, Rd, and Ra as shown in Table 5.

TABLE 6

| | Wavelength dispersion at 1550 nm [ps/km/nm] | | $LP_{11}$ bend loss (R = 40 mm) | $LP_{01}$ $A_{eff}$ |
|---|---|---|---|---|
| $\Delta\tau$ [ps/km] | $LP_{01}$ | $LP_{11}$ | [dB/km] | [µm²] |
| −0.3 | 20.61 | 9.43 | $9.50 \times 10^{-3}$ | 160.2 |

As is clear from Table 6, it is possible to meet the four conditions (the third-order mode cutoff condition, the low mode dispersion condition, the large effective core area condition, and the low bend loss condition) in a case where the parameters $\Delta$, Rd, and Ra are set as shown in Table 5. In particular, as is shown by the effective core area Aeff that reaches 160.2, it is possible to attain a remarkably large effective core area Aeff which was conventionally difficult to attain.

(Mode Dispersion Compensation)

In a case where the optical fiber 1 of the present embodiment has a positive mode dispersion, it is preferable that an optical transmission line be made up of the optical fiber 1 in combination with an optical fiber 2 which has a negative mode dispersion. This makes it possible to attain an optical transmission line whose mode dispersion is smaller than that of an optical transmission line constituted by the optical fiber 1 only.

FIG. 10 illustrates an example configuration of an optical transmission line 10 whose mode dispersion is smaller than that of the optical transmission line constituted by the optical fiber 1 only. The optical transmission line 10 is an optical transmission line configured by fusion-bonding (i) an exit end surface of the optical fiber 1 having a positive mode dispersion $\Delta\tau p$ and (ii) an incident end surface of the optical fiber 2 having a negative mode dispersion $\Delta\tau n$.

A phase of light in an LP11, which light has entered the optical fiber 1, advances by $\Delta\tau p$ with respect to a phase of an LP01 while the light propagates through the optical fiber 1. The phase of the LP11 of the light which has entered the optical fiber 2 delays by $\Delta\tau n$ with respect to the phase of LP01 while the light propagates through the optical fiber 2. Therefore, an advance in phase caused while the light propagates the optical fiber 1 is compensated by a delay in phase caused while the light propagates the optical fiber 2 (Mode Dispersion Compensation), in a case where $Lp \times |\Delta\tau p| \approx Ln \times |\Delta\tau n|$ where Lp represents a length of the optical fiber 1 and Ln represents a length of the optical fiber 2.

An optical fiber 1 which is set to meet the above-described parameter constraint condition and have a mode dispersion $\Delta\tau np$ of not less than 5 ps/km but not more than 20 ps/km is preferably combined with, for example, an optical fiber 2 which meets the following conditions.

The mode dispersion $\Delta\tau n$ is not less than −105 ps/km but not more than −95 ps/km.

An effective core area Aeff related to an LP01 is not less than 150 µm² and is substantially equal to that of the optical fiber 1.

A bend loss (R=40 mm) related to an LP11 is not more than $1.0 \times 10^{-2}$ dB/km.

Example Setting of Parameter

The following description will discuss a first example setting of parameters $\Delta$, Rd, and Ra of each of the optical fibers 1 and 2 which constitute the optical transmission line 10. Note that each of the optical fibers 1 and 2 has the refractive index distribution shown in (b) of FIG. 1.

Table 7 shows an example setting of the parameters $\Delta$, Rd, and Ra of the optical fiber 1 having the positive mode dispersion $\Delta\tau np$. In the example setting, the core radius a is 15.7, and the equivalent V value T is 4.33.

TABLE 7

| Parameter | Value |
|---|---|
| Core $\Delta$ | 0.34 |
| Rd | 0.2 |
| Ra | 0.8 |
| Core radius | 15.7 |
| Equivalent V value T | 4.33 |

Table 8 shows transmission properties (mode dispersion, wavelength dispersion, bend loss, and effective core area) of the optical fiber 1 whose parameters $\Delta$, Rd, and Ra are set as shown in Table 7.

TABLE 8

| | Wavelength dispersion at 1550 nm [ps/km/nm] | | $LP_{11}$ bend loss (R = 40 mm) | $LP_{01}$ $A_{eff}$ |
|---|---|---|---|---|
| $\Delta\tau$ [ps/km] | $LP_{01}$ | $LP_{11}$ | [dB/km] | [µm²] |
| +20.0 | 20.65 | 8.76 | $6.18 \times 10^{-6}$ | 164.15 |

Table 9 shows an example setting of the parameters $\Delta$, Rd, and Ra of the optical fiber 2 having the negative mode dispersion $\Delta\tau n$. In the example setting, the core radius a is 15.8, and the equivalent V value T is 4.36.

TABLE 9

| Parameter | Value |
| --- | --- |
| Core $\Delta$ | 0.34 |
| Rd | 0.1 |
| Ra | 0.8 |
| Core radius | 15.8 |
| Equivalent V value T | 4.36 |

Table 10 shows transmission properties (mode dispersion, wavelength dispersion, bend loss, and effective core area) of the optical fiber 2 whose parameters $\Delta$, Rd, and Ra are set as shown in Table 9.

TABLE 10

| | Wavelength dispersion at 1550 nm | | $LP_{11}$ bend loss (R = 40 mm) | $LP_{01}$ $A_{eff}$ |
| --- | --- | --- | --- | --- |
| $\Delta\tau$ [ps/km] | $LP_{01}$ | $LP_{11}$ | [dB/km] | [$\mu m^2$] |
| −103.4 | 20.55 | 8.81 | $5.14 \times 10^{-6}$ | 166.0 |

The mode dispersion $\Delta\tau p$ of the optical fiber 1 is +20.0 ps/km, and the mode dispersion $\Delta\tau n$ of the optical fiber 2 is −103.4 ps/km. As such, by setting the length Lp of the optical fiber 1 and the length Ln of the optical fiber 2 so as to satisfy Lp:Ln=517:100, it is possible to attain an optical transmission line 10 which meets the third-order mode cutoff condition, the large effective core area condition, and the low bend loss condition, and which has a mode dispersion $\tau n$ of approximately 0 (zero).

The following description will discuss a second example setting of the parameters $\Delta$, Rd, and Ra of each of the optical fibers 1 and 2 which constitute the optical transmission line 10. Note that each of the optical fibers 1 and 2 has the refractive index distribution shown in (b) of FIG. 1.

Table 11 shows an example setting of the parameters $\Delta$, Rd, and Ra of the optical fiber 1 having the positive mode dispersion $\Delta\tau p$. In the example setting, the core radius a is 15.4, and the equivalent V value T is 4.31.

TABLE 11

| Parameter | Value |
| --- | --- |
| Core $\Delta$ | 0.35 |
| Rd | 0.2 |
| Ra | 0.8 |
| Core radius | 15.4 |
| Equivalent V value T | 4.31 |

Table 12 shows transmission properties (mode dispersion, wavelength dispersion, bend loss, and effective core area) of the optical fiber 1 whose parameters $\Delta$, Rd, and Ra are set as shown in Table 11.

TABLE 12

| | Wavelength dispersion at 1550 nm [ps/km/nm] | | $LP_{11}$ bend loss (R = 40 mm) | $LP_{01}$ $A_{eff}$ |
| --- | --- | --- | --- | --- |
| $\Delta\tau$ [ps/km] | $LP_{01}$ | $LP_{11}$ | [dB/km] | [$\mu m^2$] |
| +18.8 | 20.60 | 8.26 | $4.06 \times 10^{-3}$ | 158.67 |

Table 13 shows an example setting of the parameters $\Delta$, Rd, and Ra of the optical fiber 2 having the negative mode dispersion $\Delta\tau n$. In the second example setting, the core radius a is 15.3, and the equivalent V value T is 4.28.

TABLE 13

| Parameter | Value |
| --- | --- |
| Core $\Delta$ | 0.35 |
| Rd | 0.12 |
| Ra | 0.8 |
| Core radius | 15.8 |
| Equivalent V value T | 4.28 |

Table 14 shows transmission properties (mode dispersion, wavelength dispersion, bend loss, and effective core area) of the optical fiber 2 whose parameters $\Delta$, Rd, and Ra are set as shown in Table 13.

TABLE 14

| | Wavelength dispersion at 1550 nm | | $LP_{11}$ bend loss (R = 40 mm) | $LP_{01}$ $A_{eff}$ |
| --- | --- | --- | --- | --- |
| $\Delta\tau$ [ps/km] | $LP_{01}$ | $LP_{11}$ | [dB/km] | [$\mu m^2$] |
| −105.0 | 20.53 | 8.55 | $5.14 \times 10^{-6}$ | 158.26 |

The mode dispersion $\Delta\tau p$ of the optical fiber 1 is +18.8 ps/km, and the mode dispersion $\Delta\tau n$ of the optical fiber 2 is −105.0 ps/km. As such, by setting the length Lp of the optical fiber 1 and the length Ln of the optical fiber 2 so as to satisfy Lp:Ln=525:94, it is possible to attain an optical transmission line 10 which meets the third-order mode cutoff condition, the large effective core area condition, and the low bend loss condition, and which has a mode dispersion $\tau n$ of approximately 0 (zero).

CONCLUSION

An optical fiber of the present embodiment is configured to include: an inner core whose refractive index distribution has an $\alpha$ profile; an outer core which surrounds the inner core; and a clad which surrounds the outer core, the optical fiber having Rd of not less than 0.15 where Rd is a ratio of a relative refractive index difference between the outer core and the clad to a relative refractive index difference between a center part of the inner core and the clad.

According to the configuration, it is possible to realize an optical fiber which meets a third-order mode cutoff condition and a low mode dispersion condition by appropriately setting parameters Ra and $\Delta$, and a core radius a (which will be later described).

What is meant by the third-order mode cutoff condition is a condition imposed on a parameter which defines a structure of an optical fiber so that the optical fiber can cut off a third-order mode or higher-order modes of light which has entered the optical fiber. That is, the third-order mode cutoff condition is a condition imposed on a parameter which defines a structure of an optical fiber so that the optical fiber can function as a two-mode optical fiber. What is meant by the low mode dispersion condition is a condition imposed on a parameter which defines a structure of an optical fiber so that a mode dispersion $\Delta\tau$ is not less than −5 ps/km but not more than +20 ps/km.

It is preferable to configure the optical fiber of the present embodiment such that Rd is not less than 0.15 but not more than 0.25.

According to the configuration, it is possible to realize an optical fiber which meets not only the third-order mode cutoff condition and the low mode dispersion condition but also a large effective core area condition by appropriately setting the parameters Ra and Δ, and the core radius a (which will be later described).

What is meant by the large effective core area condition is a condition imposed on a parameter which defines a structure of an optical fiber so that an effective core area Aeff related to an LP01 is not less than 150 μm².

It is preferable to configure the optical fiber of the present embodiment such that Rd is not less than 0.15 but not more than 0.23.

According to the configuration, it is possible to realize an optical fiber which meets not only the third-order mode cutoff condition, the low mode dispersion condition, and the large effective core area condition but also a low bend loss condition by appropriately setting the parameters Ra and Δ, and the core radius a (which will be later described).

What is meant by the low bend loss condition is a condition imposed on a parameter which defines a structure of an optical fiber so that a bend loss (R=40 mm) related to an LP11 is not more than $1.0\times10^{-2}$ dB/km.

It is preferable to configure the optical fiber of the present embodiment so as to have Ra of not more than 0.80 where Ra is a ratio of a radius of the inner core to an outer radius of the outer core.

According to the configuration, it is possible to realize an optical fiber which meets the third-order mode cutoff condition and the low mode dispersion condition by appropriately setting the parameter Δ and the core radius a (which will be later described).

It is preferable to configure the optical fiber of the present embodiment such that Ra is not less than 0.77.

According to the configuration, it is possible to realize an optical fiber which meets not only the third-order mode cutoff condition and the low mode dispersion condition but also the large effective core area condition by appropriately setting the parameter Δ and the core radius a (which will be later described).

It is preferable to configure the optical fiber of the present embodiment such that Ra be not less than 0.78.

According to the configuration, it is possible to realize an optical fiber which meets not only the third-order mode cutoff condition, the low mode dispersion condition, and the large effective core area condition but also the low bend loss condition by appropriately setting the parameter Δ and the core radius a (which will be later described).

It is preferable to configure the optical fiber of the present embodiment such that in a case where the relative refractive index difference between the center part of the inner core and the clad is $\Delta[\%]=[(n1^2-n2^2)/2n1^2]\times100$, where n1 represents a refractive index of the center part of the inner core, and n2 represents a refractive index of the clad, (Rd, Ra, Δ) is included in a pentahedron defined by six vertexes P1 (0.23, 0.78, 0.35), P2 (0.23, 0.80, 0.35), P3 (0.15, 0.78, 0.37), P4 (0.15, 0.80, 0.38), P5 (0.15, 0.78, 0.32), and P6 (0.15, 0.80, 0.32) in a parameter space spanned by Rd, Ra and Δ.

According to the configuration, it is possible to realize an optical fiber which meets the third-order mode cutoff condition, the low mode dispersion condition, the large effective core area condition, and the low bend loss condition by appropriately setting the core radius a.

It is preferable to configure the optical fiber of the present embodiment such that Rd is not less than 0.15 but not more than 0.20, Ra is not less than 0.78 but not more than 0.8, and Δ is not less than 0.34 but not more than 0.36.

According to the configuration, conditions imposed on respective parameters are individually determined. It is therefore possible to set the parameters individually. This makes it easy to design the optical fiber.

An optical transmission line of the present embodiment is configured to include: the optical fiber; and a mode dispersion compensating optical fiber having a mode dispersion which is opposite in sign to a mode dispersion of the optical fiber.

According to the configuration, it is possible to realize an optical transmission line whose mode dispersion is smaller than that of an optical transmission line constituted by the optical fiber only.

ADDITIONAL DESCRIPTION

The present invention is not limited to the description of the embodiments above, and can therefore be modified by a skilled person in the art within the scope of the claims. Namely, an embodiment derived from a proper combination of technical means disclosed in different embodiments is encompassed in the technical scope of the present invention.

The above-described embodiment assumes that the refractive index distribution of the inner core has an α profile where α is 2. However, the present invention is not limited to this. That is, the refractive index distribution of the inner core should have an α profile, but a does not necessarily have to be 2.

INDUSTRIAL APPLICABILITY

An optical fiber of the present invention is suitably applicable to a large-volume transmission optical fiber, particularly to a long-distance transmission optical fiber.

REFERENCE SIGNS LIST

1: optical fiber
11: core
111: inner core
112: outer core
12: clad
2: optical fiber (mode dispersion compensating optical fiber)
10: optical transmission line

The invention claimed is:
1. An optical fiber comprising:
an inner core whose refractive index distribution has an α profile;
an outer core which surrounds the inner core; and
a clad which surrounds the outer core,
the optical fiber having Rd of not less than 0.15 where Rd is a ratio of a relative refractive index difference between the outer core and the clad to a relative refractive index difference between a center part of the inner core and the clad, wherein the optical fiber is configured to transmit light in a fundamental mode and, when a wavelength of incident light is 1.55 μm, to transmit light in a second-order mode.

2. The optical fiber as set forth in claim 1, wherein:
Rd is not less than 0.15 but not more than 0.25.

3. The optical fiber as set forth in claim 2, wherein:
Rd is not less than 0.15 but not more than 0.23.

4. The optical fiber as set forth in claim 3, wherein:
the optical fiber has Ra of not more than 0.80 where Ra is a ratio of a radius of the inner core to an outer radius of the outer core.

5. The optical fiber as set forth in claim 4, wherein:
Ra is not less than 0.77.

6. The optical fiber as set forth in claim 5, wherein:
Ra is not less than 0.78.

7. The optical fiber as set forth in claim 6, wherein:
in a case where the relative refractive index difference between the center part of the inner core and the clad is $\Delta$ [%]=$(n1^2-n2^2)/2n1^2 \times 100$, where n1 represents a refractive index of the center part of the inner core, and n2 represents a refractive index of the clad, (Rd, Ra, $\Delta$) is included in a pentahedron defined by six vertexes P1 (0.23, 0.78, 0.35), P2 (0.23, 0.80, 0.35), P3 (0.15, 0.78, 0.37), P4 (0.15, 0.80, 0.38), P5 (0.15, 0.78, 0.32), and P6 (0.15, 0.80, 0.32) in a parameter space spanned by Rd, Ra and $\Delta$.

8. The optical fiber as set forth in claim 7, wherein:
Rd is not less than 0.15 but not more than 0.20, Ra is not less than 0.78 but not more than 0.8, and $\Delta$ is not less than 0.34 but not more than 0.36.

9. An optical transmission line comprising:
an optical fiber recited in claim 1; and
a mode dispersion compensating optical fiber having a mode dispersion which is opposite in sign to a mode dispersion of the optical fiber.

10. A method for manufacturing an optical fiber including an inner core whose refractive index distribution has an α profile, an outer core which surrounds the inner core, and a clad which surrounds the outer core, said method comprising the step of:
setting respective refractive indices of the inner core, the outer core, and the clad so that the optical fiber has Rd of not less than 0.15 where Rd is a ratio of a relative refractive index difference between the outer core and the clad to a relative refractive index difference between a center part of the inner core and the clad, wherein the optical fiber is configured to transmit light in a fundamental mode and, when a wavelength of incident light is 1.55 μm, to transmit light in a second-order mode.

11. An optical fiber comprising:
an inner core whose refractive index distribution has an α profile;
an outer core which surrounds the inner core; and
a clad which surrounds the outer core,
the optical fiber having Rd of not less than 0.15 where Rd is a ratio of a relative refractive index difference between the outer core and the clad to a relative refractive index difference between a center part of the inner core and the clad; wherein Rd is not less than 0.15 but not more than 0.23,
the optical fiber has Ra of not more than 0.80 where Ra is a ratio of a radius of the inner core to an outer radius of the outer core, Ra is not less than 0.78, and
in a case where the relative refractive index difference between the center part of the inner core and the clad is $\Delta[\%]=(n1^2-n2^2)/2n1^2 \times 100$, where n1 represents a refractive index of the center part of the inner core, and n2 represents a refractive index of the clad, (Rd, Ra, $\Delta$) is included in a pentahedron defined by six vertexes P1 (0.23, 0.78, 0.35), P2 (0.23, 0.80, 0.35), P3 (0.15, 0.78, 0.37), P4 (0.15, 0.80, 0.38), P5 (0.15, 0.78, 0.32), and P6 (0.15, 0.80, 0.32) in a parameter space spanned by Rd, Ra and $\Delta$.

12. The optical fiber as set forth in claim 11, wherein
Rd is not less than 0.15 but not more than 0.20, Ra is not less than 0.78 but not more than 0.8, and $\Delta$ is not less than 0.34 but not more than 0.36.

\* \* \* \* \*